Sept. 20, 1955        I. CISSKI        2,718,152
MOTION PICTURE CAMERA FOOTAGE INDICATOR DRIVE
Filed Feb. 14, 1951
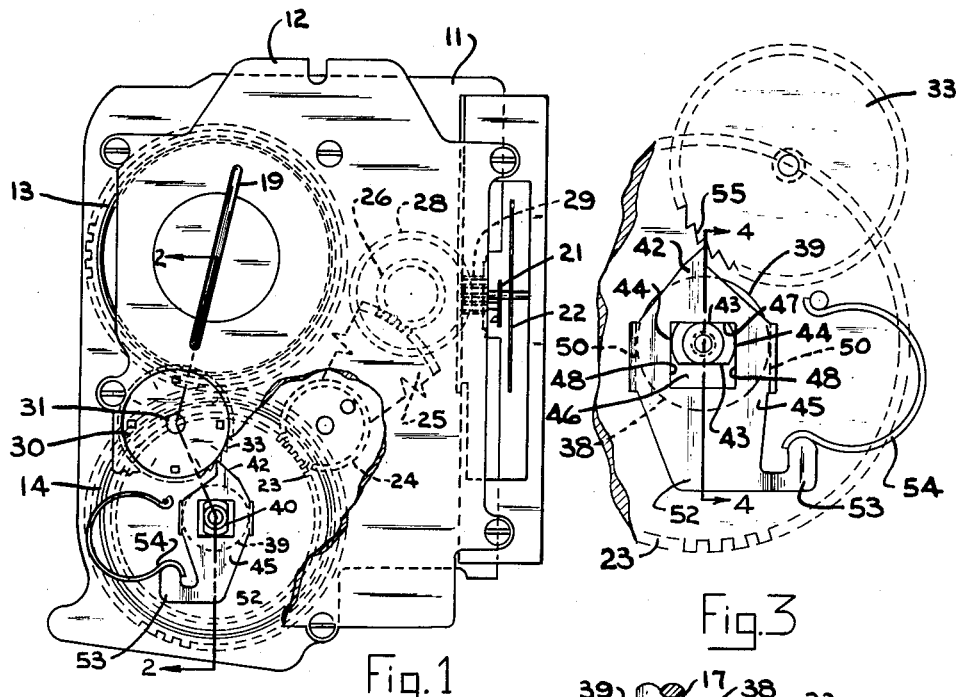
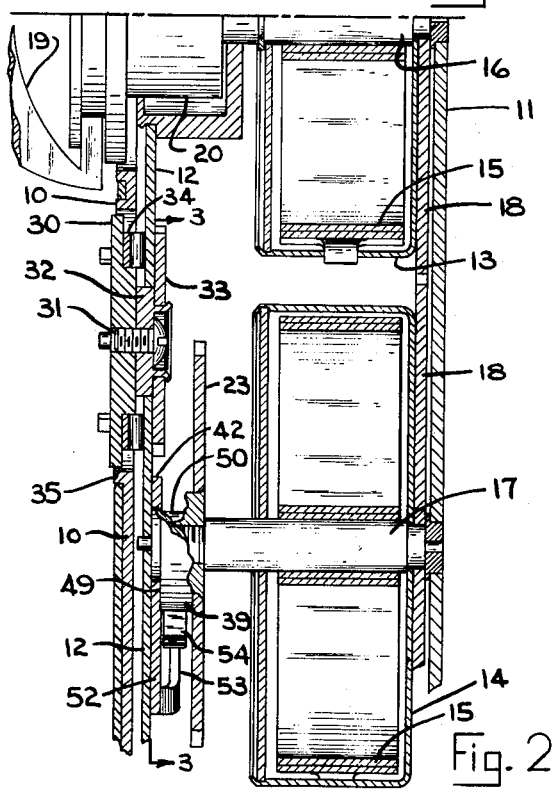
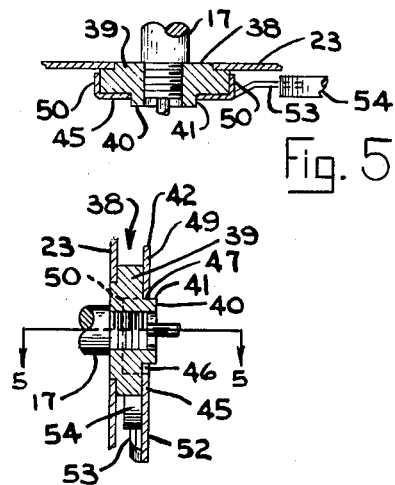
Irving Cisski
INVENTOR.
BY
ATTORNEYS

United States Patent Office 2,718,152
Patented Sept. 20, 1955

2,718,152

MOTION PICTURE CAMERA FOOTAGE INDICATOR DRIVE

Irving Cisski, Schiller Park, Ill., assignor to Ampro Corporation, Chicago, Ill., a corporation of Illinois Application February 14, 1951, Serial No. 210,979

10 Claims. (Cl. 74—125)

The present invention relates to footage indicators for motion picture cameras, that serve to inform an operator of the length of film that has been exposed or the length of film that remains to be exposed. Such indicators are well known and usually take the form of dials that are calibrated in terms of film length and are rotated by the mechanisms of cameras with which they are assembled in such ratios between angular movement of the dials and numbers of film transport operations that the dial calibration accurately indicates film lengths exposed or remaining to be exposed.

More particularly the invention relates to mechanism for driving such a footage indicator from a camera motor. Heretofore such driving generally has been provided for by means of a gear train having an input operated by a selected rotating element of the motor-actuated mechanism that drives the camera transport and shutter, and an output connected to the indicator for rotating it. Such a train heretofore has been designed from considerations of the indicator calibration and the ratio of degree of angular movement of the selected operating mechanism element to numbers of transport operations necessary for accurate indication of film lengths. While such gear trains are satisfactory, they are costly and their inclusion in cameras substantially increases their expense.

The present invention is based on the primary concept of providing for such a film footage indicator a low cost, gearless drive arranged to advance the indicator intermittently but in increments that are sufficiently small and occur at sufficiently high frequency to render negligible the maximum error between the footage indication and the film length actually transported. In the case of 8 millimeter film, for example, an intermittent advance of the footage dial occurring in a ratio of one indicator advance to transport of a film length of the order of 3 to 5 inches is completely satisfactory for the purpose of indicating to the operator the length of film transported, and is entirely practical from a mechanism design point of view.

A primary object of the invention is the provision of a novel, gearless footage indicator drive for a motion picture camera.

Another object is the provision of a motion picture camera motor mechanism with a novel reciprocating drive assembly for operating a film footage indicator.

Still another object is the provision of such a mechanism that may be reset at any time by manual movement of the indicator to a selected position.

Another object is the provision of an extremely simple, novel and practical mechanism for converting rotary motion of a motion picture camera drive mechanism element to a reciprocating movement suitable for intermittently driving a ratchet wheel that is secured to the rotatable camera film footage indicator.

Another object is the provision of novel ratchet, pawl and pawl-actuating means for driving a motion picture camera film footage indicator.

In the accompanying drawings:

Fig. 1 is an elevation of a motion picture camera assembly including transport and shutter, and motor and turns-increasing mechanism sub-assemblies, the latter being provided with a footage dial and drive therefor arranged in accordance with the invention.

Fig. 2 is a fragmentary enlarged section on line 2—2 of Fig. 1.

Fig. 3 is an enlarged sectional view on line 3—3 of Fig. 2.

Fig. 4 is a section on line 4—4 of Fig. 3.

Fig. 5 is a section in line 5—5 of Fig. 4.

Describing the drawings in detail, a camera casing includes a side structure 10, shown in Fig. 2, and encloses the motor and turns-increasing mechanism sub-assembly, shown in Fig. 1 and which comprises laterally spaced side plates 11, 12, between which the motor and the mechanism elements are supported. The motor shown comprises a pair of barrels 13, 14 each of which contains a drive spring 15 connected between a central shaft, designated 16 and 17 in the two assemblies, and the barrel. The spring barrels are connected in tandem by meshed gears 18 that are secured to them. The shaft of one spring and barrel assembly, shown as shaft 16 of the upper assembly, serves as the winding staff, having connected to it a key 19 and a device 20 of a conventional form for limiting rotation of the shaft to the proper direction for spring winding. Device 20 may also include a one-way clutch, if desired, for purposes of winding by an oscillating rotation of the key.

Shaft 17 of the other assembly serves as the motor output or main drive shaft for turns-increasing mechanism that operates a film transport shuttle 21 and a shutter 22. Such mechanism is shown as comprising a motor gear 23 meshed with a take-off gear 24, a driver gear 25 that rotates with take-off gear 24, a driven gear 26 that is meshed with driver gear 25 and also rotates a crown gear 28 meshed with a transport and shutter-operating pinion 29. This mechanism train is such that a definite ratio exists between angular movement of each gear and numbers of film-advancing operating cycles of the shuttle 21. Also the shuttle is arranged to operate cyclically to intermittently advance film in increments of predetermined length.

The film footage indicator is shown as a dial 30 set into the casing wall 10 and having on its outer surface a scale calibrated in terms of film length. Dial 30 is shown as secured by a screw 31 to a short bearing shaft 32 rotatable in a matching opening in the adjacent mechanism side plate 12, and having secured to its inner end and bearing against the inside of plate 12 a ratchet wheel 33. Ratchet wheel 33, bearing shaft 32 and dial 30 rotate together as a unit, and a friction washer 34 is interposed between the latter and the outer surface of plate 12 to brake the assembly and maintain it against accidental rotation. An index mark 35 appears on the outer camera surface adjacent dial 30 for cooperation with the dial scale.

A rotary element of the motor and turns-increasing mechanism is selected to drive the ratchet wheel 33 intermittently in a suitable relation between degree of and frequency of angular movement increments imparted in the dial and the frequency and length of film increments advanced by film transport operation cycles. Such drive is accomplished by a reciprocating ratchet-wheel-rotating element actuated by the selected rotatable mechanism element, and the proper relation between ratchet wheel operation and transport operation is established by selecting the length and frequency of the ratchet wheel advancing strokes of such element in accordance with the ratio of angular movement of the selected rotatable mechanism element to numbers of transport operation cycles.

In the form of the invention shown, the mechanism element selected for driving footage dial 30 is the motor output shaft 17. To convert rotary motion of this shaft to reciprocating motion for driving the ratchet wheel, shaft 17 is provided with camming means. Advantageously, and as shown, such camming means comprises a part of a hub portion 38 of the motor gear 23. This hub portion includes a body part 39 having a cylindrical periphery and rotatable concentric with shaft 17, and a member 40 projecting axially from body part 39, also concentric with shaft 17, and providing a peripheral cam surface 41. Cam surface 41 is contoured to produce the frequency and magnitude of dial advancements selected to occur during a rotation of shaft 17, and provides a cam contour surface portion that accomplishes each such advancement. Intervening or dwell reaches of the cam surface are arcuate, of equal radii and concentric with shaft 17.

The reciprocating element that intermittently advances ratchet wheel 32 and dial 30 is shown as a pawl structure including a pawl arm 42 provided with a toothed end for intermittently engaging the teeth of wheel 32 and rotating the latter through an angular increment. In the arrangement shown, the cam surface 41 has two opposite cam contour portions in the form of surfaces 43 and that are disposed on chords of intervening arcuate reaches 44. These latter reaches are diametrically opposite and of equal radii and the hub portion 40 providing cam surface 41 in effect comprises a cylindrical member with opposite flatted portions that provide the straight surfaces 43.

Pawl arm 42 is attached to a cam surface follower in the form of a body plate 45 that has an aperture 46 through which member 40 is extended with cam surface 41 in registration with the plate edges defining aperture 46. One of those edges comprises a follower edge 47 that is extended generally transverse to the direction of ratchet wheel-advancing strokes of pawl arm 42, and that is disposed to one side of cam surface 41 in one direction of pawl reciprocation. The follower edge 47 is shown in preferred form as straight and disposed for intermittent face-to-face contact with the flat cam surfaces 43. Two other edges 48 of aperture 46 are straight and disposed generally parallel to the directions of pawl reciprocation and on opposite sides of hub portion 40 for slidable contact with the arcuate cam surface reaches 44. Plate 45 surrounding aperture 46 is flat and in face-to-face slidable contact with the end surface 49 of cylindrical body part 39 which end surface also is flat and disposed at right angles to the axis of rotation of the assembly. As shown in Fig. 2, the cylindrical body and surface 49 and the adjacent inner surface of mechanism side plate 12 serve to guide the pawl for engagement with ratchet wheel 33. Pawl follower body 45 also has marginal flanges 50 extended generally parallel to the directions of pawl reciprocation and slidably contacting opposite sides of cylindrical periphery of body part 39.

In the form of pawl arrangement shown, the follower surface 47 is disposed to the side of cam surface 41 in the direction of ratchet wheel-advancing strokes of the pawl. Bias means are provided, urging the pawl in the opposite or return stroke direction to maintain the follower surface in contact with the cam surface, so that advance strokes are positive, occurring as the angular position of a cam contour surface 43 advances from the position of Fig. 3 to that of Fig. 1.

It will be noted that the contacting surface of the pawl follower and rotating assembly are such as to permit swinging of the pawl about the axis of rotation in any stroke position of the pawl. This swinging action is provided not only to permit the pawl arm tooth to pass the ratchet wheel teeth during return strokes of the pawl, but also to permit manual reset of the indicator dial by turning the dial and ratchet wheel assembly in the advancing direction and in any position of the pawl along its stroke path.

The spring bias means is arranged to bias the pawl both longitudinally as described above and also rotatively to maintain the tooth arm 42 in contact with the ratchet wheel, for engaging and advancing the latter during forward pawl strokes. To provide for such biasing the follower body 45 has a part 52 extended from it beyond the side of cam surface 41 opposite follower surface 47. An arm 53 projects laterally of part 52 and is engaged by a bias spring 54 that is disposed to exert its force to return the pawl. Since the bias force is exerted at a point spaced to one side of a plane passing through the axis of pawl rotation provided by engagement of cylindrical body 39 between the side flanges 50 of the pawl body, and generally parallel to the direction of pawl strokes, the spring also urges the pawl rotatively, clockwise as seen in Fig. 3, to urge pawl arm 42 into contact with ratchet wheel 32 at all times.

From Fig. 3 it will be seen that when the pawl is at the limit of its return stroke the tooth of arm 42 is spaced rearward from the tooth 55 that will be contacted at the succeeding forward pawl stroke. Such spacing is accomplished by so relating the cam throw distance, determined by the difference in radial spacings of arcuate dwell surfaces 44 and the centers of cam contour surfaces 43 from the axis of shaft 17, to the tooth pitch of ratchet wheel 33 that the stroke of the pawl tooth is longer than the ratchet pitch. The arrangement is used to compensate tolerances and assure intermittent pawl advance of the ratchet wheel and indicator dial.

I claim:
1. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism for intermittently advancing said ratchet wheel, comprising a structure rotatable with said driving shaft and provided with a peripheral cam surface including a cam contour portion and reaches on opposite sides of said portion that are arcuate and concentric with said structure, reciprocable ratchet wheel-advancing means including a pawl and a follower connected therewith and having a surface disposed for successive contact and movement in a direction of its reciprocation by said portion and reaches as said structure rotates, and spring means biasing said follower in the other direction of reciprocation and into contact with said cam surface.

2. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism for intermittently rotating said ratchet wheel, comprising a structure rotatable with said driving shaft and provided with a cam surface including diametrically opposite arcuate reaches of equal radii that are concentric with said structure and a cam contour portion between said reaches that is disposed on a chord thereof, ratchet wheel-advancing means comprising a reciprocable member and a cam follower portion providing a straight follower surface disposed generally transverse to the directions of reciprocation of said member and located laterally of said cam surface in one of said directions for successive contact by said reaches and cam contour portion, said follower portion including side members providing inner surfaces extended substantially parallel to said directions and spaced apart a distance equal to the diameter across said opposite arcuate reaches, said side members being disposed for respective guided contact with said arcuate reaches on opposite sides of said cam surface, and spring means biasing said follower in the direction of reciprocation to main said follower surface in contact with the cam surface.

3. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; a reciprocable pawl for intermittently advancing said ratchet wheel in equal angular increments of a magnitude determined by the length of the pawl stroke and ratchet wheel tooth pitch, said pawl having a cam follower surface disposed generally transverse to the direction of its reciprocation, a member rotatable by said driving shaft and providing a peripheral cam surface disposed for cooperation with said follower surface, spring means biasing said pawl to maintain said follower surface in contact with said cam surface, said cam surface including arcuate reaches that are concentric with said member and an intervening cam contour portion disposed on a chord of said reaches, the difference between the respective spacings from the axis of rotation of said member of the center of said cam contour portion and said arcuate reaches being so related to the tooth pitch of the ratchet wheel as to produce increments of rotation of said driven shaft having said ratio of degree of angular movement to degree of angular movement of said driving shaft.

4. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; a pawl arm arranged for engagement with said ratchet wheel and for advancing the latter by forward strokes of said pawl, and means mounting said pawl arm and for reciprocating it to accomplish such forward strokes and ratchet wheel-engagement, said mounting and reciprocating means comprising a member rotatable by said driving shaft and providing a peripheral cam surface including a cylindrical portion and a cam contour portion disposed between diametrically opposite arcuate reaches of said cylindrical portion and on a chord thereof, a follower body supporting said pawl arm and comprising a plate having therein an aperture through which said member is extended and providing a follower edge disposed generally transverse to the direction of pawl in advance strokes and registered with said cam surface, said aperture also providing straight side edges extended substantially parallel to such directions, said side edges being spaced equal to the diameter of said cylindrical portion and disposed to opposite sides of said cam surface for simultaneous contact with said diametrically opposite points of said arcuate reaches, and spring means biasing said follower and arm longitudinally in one direction of pawl arm reciprocation, to maintain said follower in contact with said cam surface, and rotatively about the axis of rotation of said arm surface to maintain said arm in contact with said ratchet wheel.

5. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism for intermittently rotating said ratchet wheel, comprising a pawl arm arranged for engagement with said ratchet wheel and for advancing the latter by forward strokes of said arm, and means mounting said pawl arm and for reciprocating it to accomplish such forward strokes and ratchet wheel engagement, said mounting and reciprocating means comprising a member rotatable by said driving shaft and providing a peripheral cam surface including a cylindrical portion and a cam contour portion disposed between diametrically opposite arcuate reaches of said cylindrical member and on a chord thereof, a cylindrical body axially adjacent said member and rotatable concentrically with it, a follower pawl body supporting said pawl arm and comprising a plate having therein an aperture through which said member is extended and providing a follower edge disposed generally transverse to the direction of pawl arm advance strokes and registered with said cam surface, said aperture also providing straight side edges extended substantially parallel to such direction, said side edges being spaced equal to the diameter of said cylindrical portion and disposed to opposite sides of said cam surface for simultaneous contact with diametrically opposite points of said arcuate reaches, said plate having a pair of parallel flanges that are longitudinally straight and extended substantially parallel to the direction of pawl arm advance strokes and for slidable contact with diametrically opposite surface portions of said cylindrical body, and spring means biasing said follower body and arm longitudinally in one direction of pawl arm reciprocation, to maintain said follower in contact with said cam surface, and rotatively about the axis of rotation of said cam surface to maintain said arm in contact with said ratchet wheel.

6. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism in accordance with claim 5, wherein said cylindrical body has a flat end surface disposed at right angles to the axis of rotation of said member and body, said cam surface is axially immediately adjacent said end surface, and said plate surrounding its aperture is flat and in slidable face-to-face contact with said end surface.

7. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism in accordance with claim 5, wherein said follower body is provided with a member extended laterally thereof and angularly relative to the direction of pawl arm advance strokes, and said spring means is disposed to exert force on said extension in a direction generally parallel to such stroke direction.

8. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism in accordance with claim 5 wherein said follower body is provided with a portion extended past said cam surface and to the opposite side thereof from said arm, and said spring means is disposed to exert biasing force on said portion in a location spaced from said cam surface in the direction of pawl arm return strokes.

9. In a ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism in accordance with claim 1, wherein said cam contour portion is disposed on a chord of said arcuate reaches.

10. In ratchet drive mechanism for intermittently imparting angular movement to a driven shaft in a preselected ratio of degree of angular movement of the latter to degree of angular movement of a driving shaft, and including a ratchet wheel connected in driving relation to said driven shaft; pawl mechanism in accordance with claim 1, wherein said contour portion is disposed on a chord of said arcuate reaches, and said follower surface is straight, maintained in contact with said cam surface by said bias means, and is disposed substantially transverse to the directions of reciprocation of said follower for parallel and intermittent face to face contact with said cam contour portion.

References Cited in the file of this patent

UNITED STATES PATENTS

| | | |
|---|---|---|
| 489,892 | Balzer | Jan. 10, 1893 |
| 541,840 | Diehl | July 2, 1895 |
| 1,606,929 | Fernandes | Nov. 16, 1926 |
| 1,869,090 | Borchert | July 26, 1932 |
| 2,186,926 | Hughey | Jan. 9, 1940 |
| 2,228,773 | Merta | Jan. 14, 1941 |
| 2,272,929 | Barth | Feb. 10, 1942 |
| 2,322,340 | Bechler | June 22, 1943 |
| 2,365,690 | Fassin | Dec. 26, 1944 |